Feb. 13, 1962     A. H. MUELLER     3,020,899
AIR-COMPRESSING INJECTION-TYPE INTERNAL COMBUSTION ENGINE
Filed Jan. 27, 1959
FIG. 1.
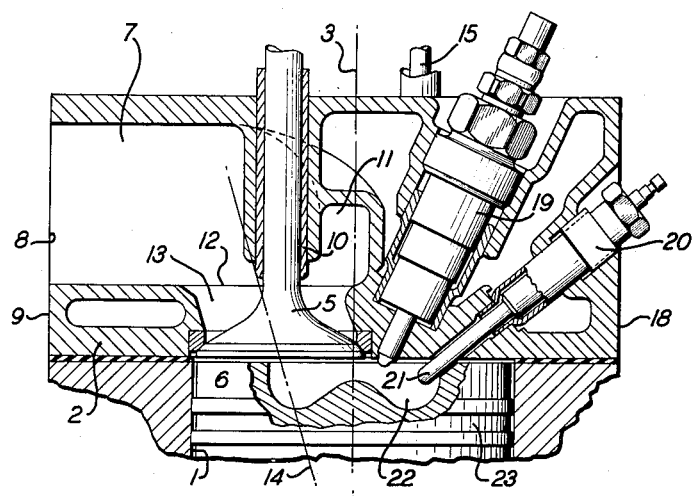
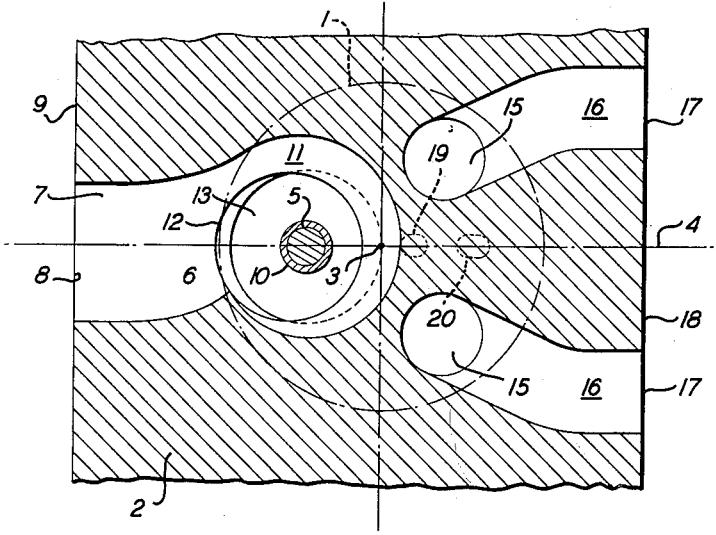
FIG. 2.
INVENTOR.
ALFRED H. MUELLER
BY
ATTORNEY United States Patent Office 3,020,899
Patented Feb. 13, 1962

3,020,899
AIR-COMPRESSING INJECTION-TYPE INTERNAL COMBUSTION ENGINE
Alfred H. Mueller, Waiblingen, Germany, assignor to Daimler-Benz Aktiengesellschaft, Stuttgart-Unterturkheim, Germany
Filed Jan. 27, 1959, Ser. No. 789,416
Claims priority, application Germany Feb. 11, 1958
11 Claims. (Cl. 123—32)

The present invention relates to an air-compressing injection-type internal combustion engine provided with an inlet valve suspended parallel to the cylinder axis and non-coaxial with respect thereto, i.e., disposed at a distance therefrom, with an inlet channel or port extending substantially parallel to the plane of the cylinder head which includes means for imparting a rotation to the incoming combustion air entering the cylinder, and with an open combustion chamber in the piston, preferably omega-shaped in cross section.

The present invention consists essentially therein that an additional channel or passage, which is directed toward the cylinder axis and slopes toward the valve seat, branches off from the inlet channel or port provided with a valve chamber spirally winding about the valve guide means and disposed in the same plane as the inlet channel.

By the use of such a construction and arrangement, it is possible that the air vortex which is imparted in the spirally-shaped valve chamber to the inflowing combustion air flowing through the inlet channel remains practically intact without loss in intensity in passing from the valve chamber through the valve opening into the cylinder, whereby in combination with the injected fuel a favorable formation of gas mixture is attained in the cylinder.

The downwardly sloping passage connecting the valve chamber with the valve seat tends to stabilize the rotating movement of the combustion air and at the same time leads the air centrally into the cylinder in such a manner that guidance of this rotating combustion air by the cylinder walls is not necessary.

According to a further feature of the present invention, the injection-type internal combustion engine may be so constructed that the inlet or intake valve is arranged to one side of a central longitudinal plane of the engine on a transverse axis passing through the center of the cylinder and that the entrance opening of the inlet channel is disposed along one longitudinal side of the cylinder head while two suspended exhaust valves having discharge openings for the outlet channels thereof located on the opposite longitudinal side of the cylinder head may be provided on the other side of this central longitudinal plane, symmetrically on each side of the aforementioned transverse axis.

With such a valve arrangement, sufficient space is available in the cylinder head for the inlet valve. As a result thereof, the diameter of the intake valve in accordance with the present invention may be made larger than the radius of the cylinder so that in combination with the two exhaust valves a time-area characteristic is obtained which is equal to that existing in internal combustion engines having four valves.

According to a further characteristic of the present invention, an injection valve or nozzle and a glow plug may be arranged between the two exhaust valves on the transverse axis passing through the cylinder center. It is thereby possible to bring the injection valve or nozzle close to the cylinder axis with sufficient space available for the placement of the glow plug. Advantageously the tip of the glow plug may project into the combustion chamber formed in the piston, when the piston is in the top dead center position thereof.

Accordingly, it is an object of the present invention to provide a simple construction for an internal combustion engine in which a rotation is effectively imparted to the combustion air prior to entering the cylinder to thereby improve the combustion process.

Another object of the present invention is to provide an internal combustion engine in which rotation of the combustion air is obtained by simple means without requiring any guide means by the cylinder walls themselves.

Still another object of the present invention is to provide an internal combustion engine provided with only a single relatively large inlet valve and with two smaller exhaust valves resulting in a favorable distribution of the valves within the cylinder head which produces effectively a time-area characteristic similar to that of an engine provided with four valves.

A further object of the present invention is to provide an internal combustion engine in which the diameter of the inlet valve may be made larger than the radius of the cylinder to thereby provide exceptionally large flow area for the incoming combustion air and therewith minimize the flow losses normally encountered with such engines.

These and other objects, features and advantages of the present invention will become more obvious from the following description when taken in connection with the accompanying drawing, which shows, for purposes of illustration only, one embodiment in accordance with the present invention, and wherein:

FIGURE 1 is an axial cross section view through the cylinder head of an air-compressing injection-type internal combustion engine according to the present invention taken transversely to the longitudinal axis of the engine, and FIGURE 2 is a schematic top view showing the location of the valves and the corresponding passages in the cylinder head shown in FIGURE 1.

Referring now to the drawing, wherein like reference numerals are used throughout the two views to designate like parts, reference numeral 1 designates the cylinder of the internal combustion engine provided with a cylinder head 2 arranged thereabove. To one side of the central longitudinal plane passing through the cylinder axis 3, a suspended inlet valve 5 with the valve seat 6 thereof is provided which is located on a transverse axis 4 passing through the center of the cylinder 1. The inlet channel or port 7 which leads to the inlet valve 5 has an entrance opening 8 on the longitudinal side 9 of the cylinder head 2. This inlet channel 7 extends substantially parallel to the plane of the cylinder head 2 and forms a spiral-shaped valve chamber 11 surrounding the valve guide 10 in the plane thereof.

A passage 13 with an inlet opening 12 adjoins this valve chamber 11 and slopes downwardly toward the valve seat 6. The center line 14 of the passage 13 is directed toward the cylinder axis 3 and forms an acute angle therewith.

Whereas the diameter of the inlet valve disc 5 is made larger than the radius of the engine cylinder 1, the diameter of each of the two exhaust valves 15, arranged opposite the inlet valve 5 and symmetrically with respect to the transverse axis 4, is considerably smaller. The exhaust ports 16 coordinated to the exhaust valves 15 terminate in the openings 17 at the longitudinal side 18 of the cylinder head 2.

An injection nozzle 19 and a glow plug 20 are arranged intermediate exhaust valves 15 on the transverse axis 4 and inclined with respect to the cylinder axis 3. The injection nozzle 19 is accessible from the top of the cylinder head 2, while the connection with the glow plug 20 is disposed at the longitudinal side 18 of the cylinder head 2. The glow electrode 21 of the glow plug 20 projects into the combustion chamber 22, disposed in the piston head 23, when the piston 23 is in its outer dead center position. The combustion chamber 22 is preferably omega-shaped in cross section.

The combustion air flowing through the inlet channel 7 is forced into rotational movement in the spiral-shaped valve chamber 11 about the valve guide 10. This rotating combustion air flows out of the spiral-shaped valve chamber 11 through the passage 13 and through the valve opening downwardly into the cylinder 1. As a result of the inclination of the axis 14 of passage 13, the rotating combustion air flows in the direction toward the cylinder axis 3 so that, ultimately, the axis 14 of the rotating air coincides with the axis 3 of the cylinder 1.

While I have shown and described only one embodiment in accordance with the present invention, it is understood that the same is not limited thereto but is susceptible of many changes and modifications within the spirit and scope of the present invention, and I, therefore, intend to cover all such changes and modifications as encompassed by the scope of the appended claims.

I claim:

1. An air-compressing, injection type internal combustion engine with direct injection, comprising cylinder means, piston means slidably arranged in said cylinder, a combustion chamber, cylinder head means including inlet valve means with valve seat means and with valve guide means, inlet channel means provided in said cylinder head means, and passage means connecting said inlet channel means with said valve seat means for imparting a rotary movement about said valve guide means to the combustion air flowing through said passage means, said passage means slanting downwardly toward said valve seat means and the center line of said passage means being directed toward the axis of said cylinder.

2. An air-compressing, injection-type internal combustion engine with direct injection, comprising cylinder means, piston means slidably arranged in said cylinder, a combustion chamber, cylinder head means including inlet valve means with valve seat means and with valve guide means, inlet channel means provided in said cylinder head means, and passage means connecting said inlet channel means with said valve seat means for imparting a rotary movement to the combustion air flowing therethrough, said passage means slanting downwardly toward said valve seat means and the center line of said passage means being directed toward the axis of said cylinder, said passage means operative to impart a rotary movement to the combustion air including a spiral-shaped valve chamber winding about said inlet valve guide means.

3. An air-compressing internal combustion engine according to claim 1, wherein said combustion chamber is formed at least in part in said piston and is essentially omega-shaped in cross section.

4. An air-compressing internal combustion engine according to claim 1, wherein said cylinder head means includes a joining surface, and wherein said inlet channel means in said cylinder head means extends substantially parallel to said joining surface.

5. An air-compressing internal combustion engine according to claim 1, wherein said inlet valve means is arranged to one side of the longitudinal central plane of the engine essentially on a transverse axis passing through the center of said cylinder, the inlet opening of said inlet channel means being located at the side of the cylinder head extending parallel to said longitudinal plane.

6. An air-compressing internal combustion engine with direct fuel injection, comprising a cylinder, a piston slidably arranged in said cylinder and forming at least in part a combustion chamber in the piston head thereof, a cylinder head provided with an abutment surface for abutment therealong against said cylinder and including one inlet and two exhaust valve means each having valve seat means and one inlet and two exhaust channel means, passage means connecting said inlet channel means with said inlet valve seat means for imparting a rotary movement to the combustion air entering said inlet channel means, the center line of said passage means forming an acute angle with and being directed toward the center line of said cylinder.

7. An air-compressing internal combustion engine according to claim 6, wherein said inlet valve means is arranged to one side of the central longitudinal plane of said engine on a transverse axis passing essentially through the center of said cylinder, the inlet opening of said inlet channel means being located at one side of the cylinder head extending parallel to said longitudinal plane, said two exhaust valve means being arranged at the other side of said central longitudinal plane of the engine symmetrically with respect to said transverse plane, and the exit openings of said exhaust channel means being located at the other side of said cylinder head which extends parallel to said longitudinal plane.

8. An air-compressing internal combustion engine according to claim 6, wherein a fuel injection nozzle and a glow plug are located between said exhaust valve means essentially on said transverse axis passing through the center of said cylinder.

9. An air-compressing internal combustion engine according to claim 8, wherein the end of said glow plug projects into said combustion chamber when the piston is in the upper dead center position.

10. An air-compressing internal combustion engine according to claim 9, wherein said piston head is essentially omega-shaped in cross section.

11. An air-compressing, injection type internal combustion engine with direct injection, comprising cylinder means, piston means in said cylinder means, a combustion chamber, cylinder head means provided with valve seat means, inlet valve means including valve disk means adapted to be seated in said valve seat means and valve stem means secured to said valve disk means, inlet channel means in said cylinder head means, and passage means connecting said inlet channel means with said valve seat means to impart to the combustion air flowing through said valve seat means a rotary movement essentially about said valve stem means ahead of said valve seat means, said passage means slanting downwardly toward said valve seat means and the center line thereof being directed toward the axis of the cylinder.

References Cited in the file of this patent

UNITED STATES PATENTS

| | | |
|---|---|---|
| 2,031,395 | Vincent | Feb. 18, 1936 |
| 2,318,914 | Anderson et al. | May 11, 1943 |
| 2,741,230 | Reynolds | Apr. 10, 1956 |
| 2,851,019 | Fleming et al. | Sept. 9, 1958 |

FOREIGN PATENTS

| | | |
|---|---|---|
| 410,047 | Great Britain | May 10, 1934 |
| 700,364 | Great Britain | Dec. 2, 1953 |